US007904197B2

(12) United States Patent
Wilson et al.

(10) Patent No.: US 7,904,197 B2
(45) Date of Patent: Mar. 8, 2011

(54) METHODS AND SYSTEMS FOR PROVIDING ONE CODE ADDRESS CORRECTION SERVICE

(75) Inventors: James D. Wilson, Collierville, TN (US); Lisa L. West, Memphis, TN (US); Gary C. Reblin, Falls Church, VA (US); William L. Gallagher, Gambrills, MD (US)

(73) Assignee: The United States Postal Service, Washington, DC (US)

( * ) Notice: Subject to any disclaimer, the term of this patent is extended or adjusted under 35 U.S.C. 154(b) by 620 days.

(21) Appl. No.: 11/225,198

(22) Filed: Sep. 14, 2005

(65) Prior Publication Data

US 2006/0184269 A1 Aug. 17, 2006

Related U.S. Application Data

(60) Provisional application No. 60/610,567, filed on Sep. 17, 2004.

(51) Int. Cl.
*G06F 7/00* (2006.01)

(52) U.S. Cl. ........................................ 700/224; 209/584

(58) Field of Classification Search .................. 700/224, 700/213; 209/584
See application file for complete search history.

(56) References Cited

U.S. PATENT DOCUMENTS

| | | | | |
|---|---|---|---|---|
| 6,292,709 | B1 | 9/2001 | Uhl et al. | |
| 6,826,548 | B2 | 11/2004 | Hungerpiller et al. | |
| 6,865,561 | B1 | 3/2005 | Allport et al. | |
| 2002/0120668 | A1 | 8/2002 | Pintsov et al. | |
| 2002/0165729 | A1* | 11/2002 | Kuebert et al. | 705/1 |
| 2003/0114955 | A1* | 6/2003 | Daniels, Jr. | 700/224 |
| 2003/0136713 | A1* | 7/2003 | Lopez | 209/584 |
| 2004/0030671 | A1 | 2/2004 | Sato | |

OTHER PUBLICATIONS

International Search Report and Written Opinion, dated Apr. 24, 2007, for International Appl. No. PCT/US05/33003, filed Sep. 16, 2005 (7 pages).

* cited by examiner

*Primary Examiner* — Gene Crawford
*Assistant Examiner* — Ramya Prakasam
(74) *Attorney, Agent, or Firm* — Finnegan, Henderson, Farabow, Garrett & Dunner, LLP

(57) ABSTRACT

One code address correction service. A carrier of items provides a sender of an item an address change service for an undeliverable address. The item includes a human readable address and a machine readable code. The machine readable code identifies at least the sender. The carrier scans the machine readable code to identify the sender and creates an address change record for the sender. The address change record includes the undeliverable address. The carrier then sends the address change record to the sender.

26 Claims, 5 Drawing Sheets

100

200

METHODS AND SYSTEMS FOR PROVIDING ONE CODE ADDRESS CORRECTION SERVICE

CROSS-REFERENCE TO RELATED APPLICATIONS

This application claims priority to U.S. Provisional Application No. 60/610,567 filed on Sep. 17, 2004, the contents of which are expressly incorporated herein by reference. The contents of Exhibits (A-D) attached to the provisional application are also incorporated by reference into the present specification.

BACKGROUND

1. Technical Field

The present invention relates to the field of resolving data. More particularly, the present invention involves methods and systems for providing an address correction service to customers of a carrier. The address correction service uses a machine readable code.

2. Related Art

Consumers receive deliveries of numerous advertisements, promotions, and other correspondence from business entities. Every day, various business mailers mail significant amounts of mailpieces to their customers. Unfortunately, for various reasons, not all mail may be delivered. Recipients may, for example, move to another location or leave for an extended period of time. In another example, business mailers may have incorrect delivery addresses for some of its customers. Due to the large volumes of business mailings and associated costs, business mailers may wish to keep track of the customers whose delivery address is undeliverable, as well as maintain correct delivery addresses for each of its customers. Unfortunately, a majority of business mailers lack tools and resources for tracking and correcting their customers' delivery addresses.

The United States Postal Service™ is an independent government agency that provides delivery and other services to the public. The U.S. Postal Service™ is widely recognized as a safe and reliable means for sending and receiving mail and other items. With the advent and steady growth of electronic mail and electronic commerce, the physical mail stream will increasingly be utilized for sending and receiving packages.

The U.S. Postal Service™ possesses reliable tools for correcting and updating delivery addresses. For example, the U.S. Postal Service™ maintains a database identifying valid delivery addresses for customers. When customers relocate or leave for extended periods of time, the U.S. Postal Service™ generally has a forwarding delivery address. Most business mailers may access such a database by asking the U.S. Postal Service™ to provide them with a notification of undeliverable delivery addresses, for example. In another example, business mailers may also request a corrected valid delivery address for customers who have relocated.

Therefore, the need to efficiently provide corrected delivery address data has become a common need for many carriers. More specifically, efficiently providing valid delivery address data has become a critical service for many delivery system operators and business mailers.

Processes for providing corrected delivery addresses to business mailers may require human intervention. Inefficiencies resulting from manual labor intervention can be very costly and time consuming. As a result, the cost of providing a corrected delivery address may be high. Consequently, fewer business mailers can afford to purchase the service.

Eliminating labor intervention may also allow significantly reduced time for processing undeliverable mail. As a result, quality of service may increase, especially for business mailers mailing time sensitive correspondence. Inaccuracy is another inefficiency associated with manual labor. A process relying on manual labor is always subject to inevitable human errors. Subsequently, at least some amount of mail never reaches its destination due to human error.

Another disadvantage of the current process is esthetic appearance of the mailpiece. Currently, each business mailer wishing to receive corrected delivery address service has to provide certain information on the face of each mailpiece it intends to mail. Research proves, however, the existence of a direct connection between the amount of data printed on a mailpiece face and customers' response to that mailpiece. Interestingly, according to the studies, a lesser amount of human readable information appearing on the mailpiece face generally results in a higher rate of consumer response. Accordingly, there remains a need for an automated and mechanized process for efficiently providing corrected delivery address data to business mailers.

SUMMARY

According to an embodiment of the invention, a carrier of items provides a sender of an item an address change service, the item including a human readable address and a machine readable code, and the machine readable code identifying at least the sender. The method comprises determining that the human readable address is undeliverable; scanning the machine readable code to identify the sender; creating an address change record for the sender, the address change record including the undeliverable address; and sending the address change record to the sender.

According to another embodiment of the invention, a method for identifying a disposition of a item comprises forwarding the item to a processing center; scanning a first code to determine a requested endorsement; determining change of address data; creating an electronic record for the disposition of the item; sending the electronic record for processing; generating and attaching a second code to the item for the disposition of the item; and sorting the item for the disposition.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Reference will now be made in detail to the present preferred embodiment of the invention, examples of which are illustrated in the accompanying drawings. Wherever possible, the same reference numbers will be used throughout the drawings to refer to the same or like parts.

Senders, such as business mailers, wishing to receive notifications about undeliverable and corrected delivery addresses may participate in a special program, such as an Address Change Service ("ACS") program. Each ACS program participant may receive updated delivery address information for its customers. For example, when a business mailer (an ACS program participant) attempts to send an item, such as a mailpiece, to a customer who has relocated, a carrier, such as the U.S. Postal Service™, may provide the business mailer with a new delivery address. In addition, if requested, the U.S. Postal Service™ may forward that mailpiece to the customer's new delivery address. Receipt of an updated delivery address may allow a business mailer to update its own database so that a correct delivery address may be used in the future.

Figure 1:
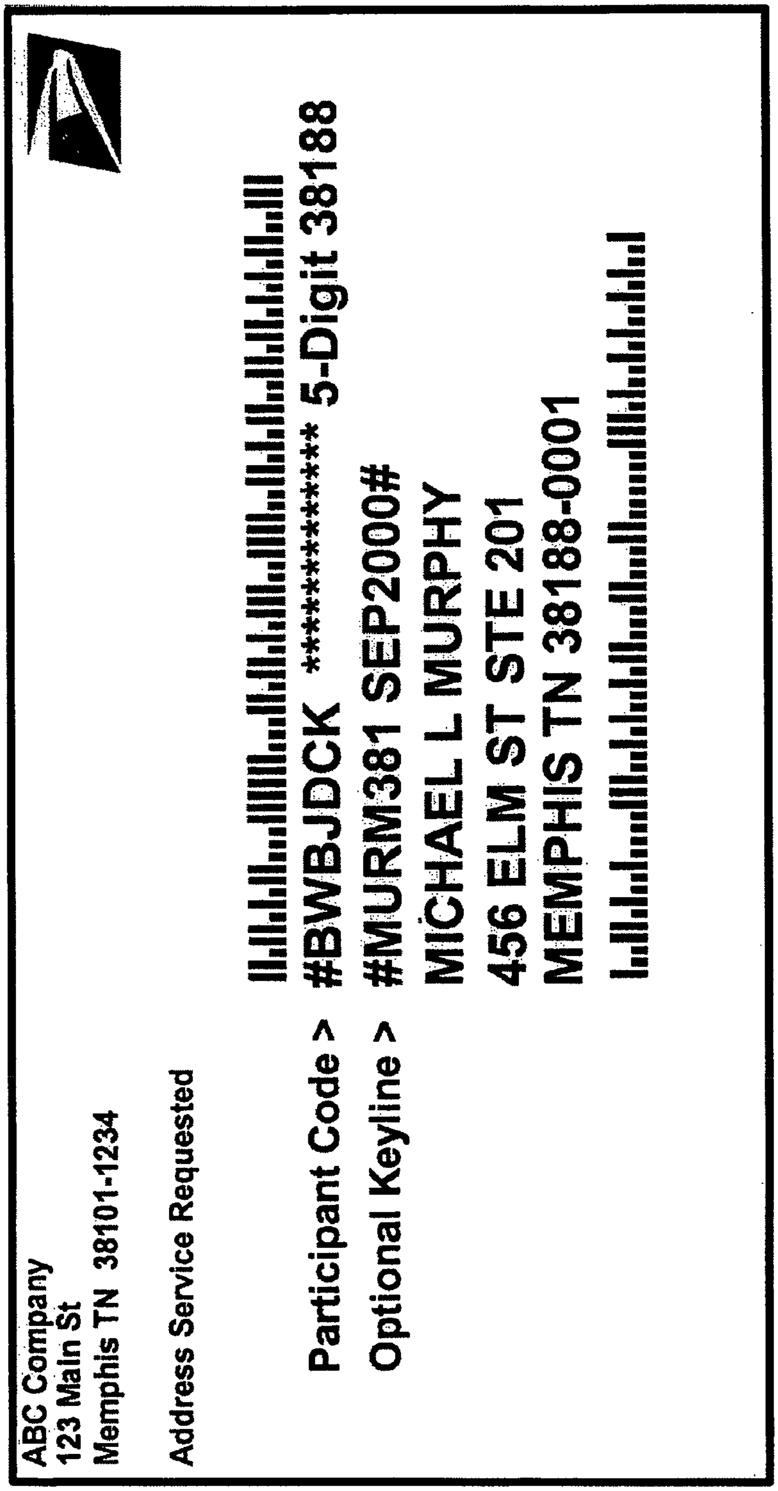
FIG. 1 is an exemplary mailpiece face depicting an Address Correction Service participant code and keyline.

The U.S. Postal Service™ may require each registered ACS program participant to list certain information on each mailpiece that the participant wishes to mail. That information may be located, for example, above the human readable delivery address on the mailpiece. FIG. 1 depicts an exemplary mailpiece face 100. The U.S. Postal Service™ may require an ACS program participant to print its participant identification code on a mailpiece face 100. As shown on FIG. 1, a participant identification code may consist of seven (7) alphabetical characters, for example. A participant code may help the U.S. Postal Service™ identify a business mailer that the U.S. Postal Service™ may need to notify about the change of the customer delivery address. The U.S. Postal Service™ may also use the participant identification code for other purposes. For example, the U.S. Postal Service™ may use the participant identification code to keep track of how many mailpieces for that participant were undeliverable. This information may be used later, for example, for billing purposes.

In addition, participants may wish to print on mailpiece face 100 an optional "keyline", as shown on FIG. 1. A keyline may consist of four (4) to sixteen (16) characters. Keyline characters may be a code that a business mailer uses to identify its customer-addressee. A business mailer, participant of the ACS program, may use the customer identification code listed on the mailpiece face 100, for example, to electronically store customer related data, including delivery address.

Figure 2:
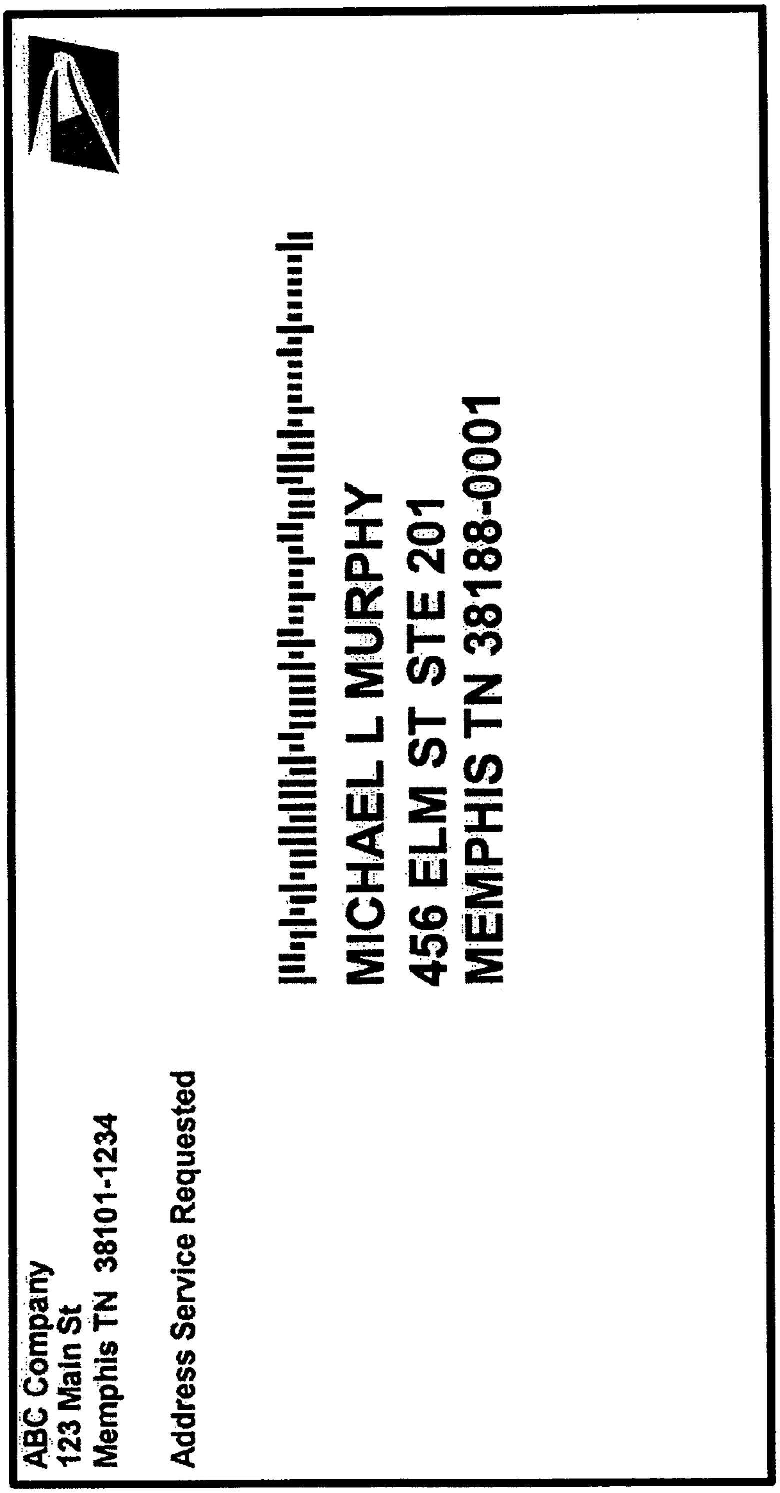
FIG. 2 is an exemplary mailpiece face depicting an Address Correction Service participant 4-state barcode.

Currently, if a mailpiece is undeliverable and the U.S. Postal Service™ needs to process that mailpiece, human labor may be required to read and enter into a database a participant identification code and a keyline. To eliminate human intervention for transferring data into database, the U.S. Postal Service™ may require each ACS program participant to print data contained in both participant identification code and a keyline in a barcode format. A 4-state barcode may be used, for example, as shown on FIG. 2. Other barcode formats, such as a 2D barcode or a PLANET™ barcode may be used as well.

A participant code and an optional keyline printed on a mailpiece face may occupy a significant portion of a mailpiece face space, as shown on FIG. 1. The space on a mailpiece face is very valuable to business mailers for both esthetical and business purposes. As discussed above, research shows that fewer human readable symbols appearing on a mailpiece face will result in a greater customer response to business mailings. Therefore, replacing two lines of alphabetical and numerical characters with one line of a barcode, as shown on FIG. 2, may be very advantageous to business mailers. In addition, an increased amount of free real estate on the mailpiece face may also provide a business mailer with greater flexibility in designing its mailpieces faces.

Figure 3:
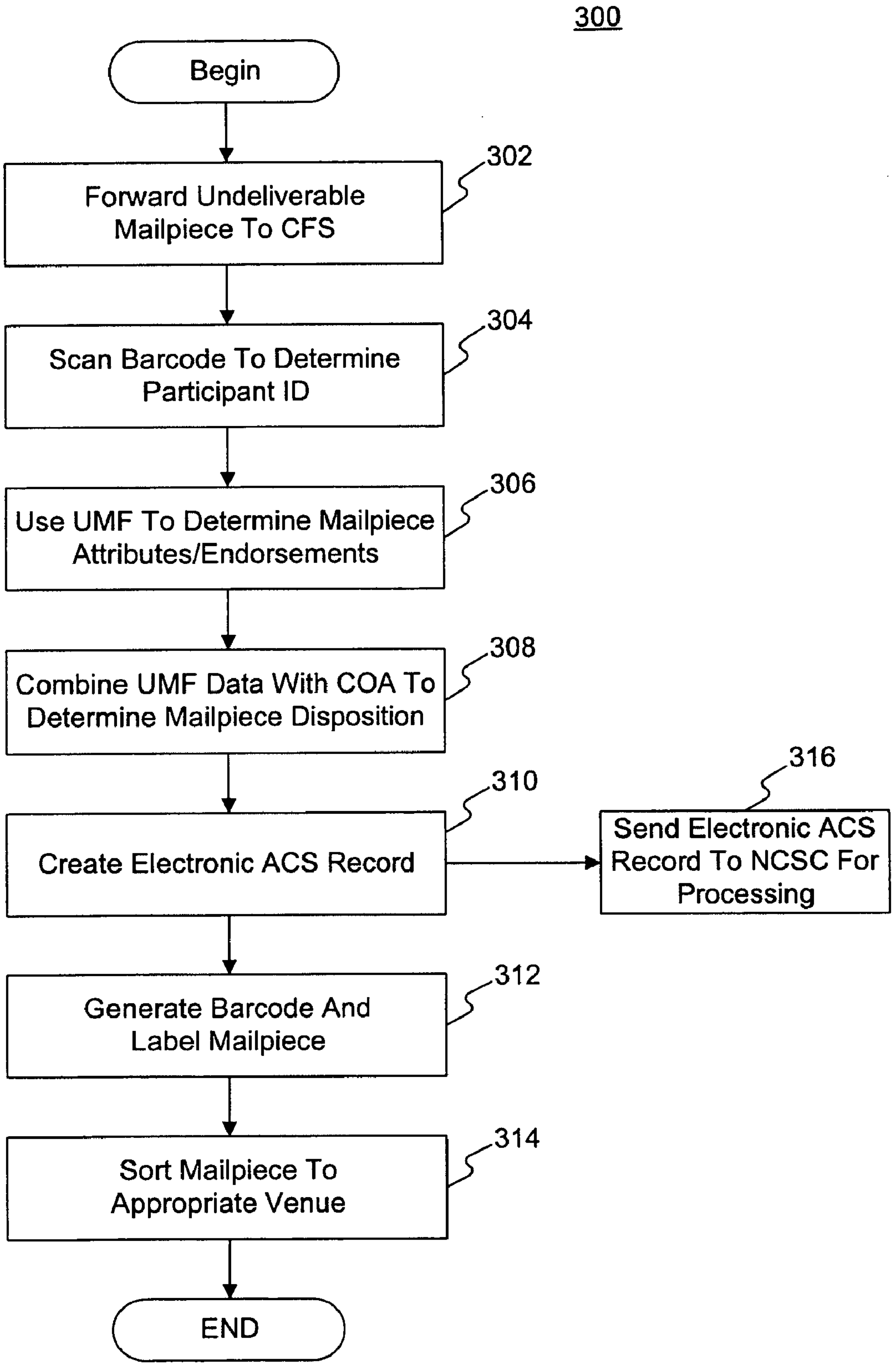
FIG. 3 is an exemplary flow chart for processing and handling of a undeliverable mailpiece bearing the 4-state barcode.

FIG. 3 is a flow chart for an exemplary method 300 for processing and handling of a mailpiece bearing, for example, a 4-state barcode, after a mailpiece was identified by a delivery unit as undeliverable. Determining disposition of such mailpieces may require its forwarding to a centralized facility, such as Computerized Forwarding System ("CFS") for processing at step 302. Once a mailpiece arrives at the Computerized Forwarding System, its barcode may be scanned at step 304. Exhibit C of U.S. Provisional Patent Application No. 60/610,567, filed on Sep. 17, 2004, provides descriptions exemplary of scanning equipment.

Based on the results of the barcode scanning, the U.S. Postal Service™ may determine participant identification code of the ACS program participant who attempted to mail that mailpiece at step 304. Based on the participant identification code, the U.S. Postal Service™ may determine disposition of the mailpiece requested by a participant, a process known as an "endorsement" at step 306. For example, a business mailer may instruct the U.S. Postal Service™ to discard all its undeliverable mailpieces. In another example, a participant may instruct the U.S. Postal Service™ to send all undeliverable mailpieces back to the participant. In yet another example, a participant may instruct the U.S. Postal Service™ to forward all mailpieces to intended customers if a forwarding delivery address is available and discard mailpieces if a forwarding delivery address is not available.

In an alternative embodiment, the U.S. Postal Service™ may create an endorsement, such as Electronic Service Requested ("ESR"). Listing that endorsement on a mailpiece face may further facilitate and accelerate processing of undeliverable mail. This is because delivery unit personnel may forward mailpieces with this endorsement to the Computerized Forwarding System for processing immediately after it is determined that a mailpiece is undeliverable.

To facilitate and expedite the process of determining dispositions of undeliverable mailpieces, the U.S. Postal Service™ may create and maintain a database such as Universal Mailer File ("UMF"). For each ACS participant, the Universal Mailer File may contain instructions as to the disposition of the mailpieces that the U.S. Postal Service™ identifies as undeliverable. To aid the forwarding of mail pieces, U.S. Postal Service™ may maintain a Change of Address ("COA") database As shown in FIG. 3, after the carrier determines the endorsement for the mailpiece required by its mailer at step 306, the carrier may combine that data with information from another database, such as for example a Change of Address database, to determine a forwarding or corrected address for an intended addressee at step 308. Once the forwarding or corrected address (assuming it is available) is identified, the carrier may create an electronic record, for example, an Address Change Service ("ACS") record at step 310. The ACS record may consist of, for example, the forwarding address and the method of disposition, such as forwarding to an intended recipient. The ACS record may also include the invalid address. An ACS program participant may also request that the carrier sends the ACS record to the mailer regardless of the mailpiece disposition. An ACS record may be sent over a network or by other means. Based on the received ACS records, an ACS program participant may then update their files for each customer whose delivery address required correction or became unavailable.

Once the U.S. Postal Service™, for example, creates an ACS record, the U.S. Postal Service™ may send that record to a centralized location, such as the National Customer Support Center ("NCSC") at step 316. At the National Customer Support Center, all the ACS records for the same ACS participant may be combined, bundled, and forwarded to the participant along with an invoice.

In some embodiments, an ACS record may be sent over a network that may comprise, for example, a local area network (LAN) or a wide area network (WAN). Such networking environments are commonplace in offices, enterprise-wide computer networks, intranets, and the Internet, and are known by those skilled in the art. When a LAN is used as the network, a network interface located at any of the processors may be used to interconnect any of the processors. When the network is implemented in a WAN networking environment, such as the Internet, the processors may typically include an internal or external modem or other means for establishing communications over the WAN. Further, data sent over a network may be encrypted to insure data security by using known encryption/decryption techniques.

In addition to utilizing a wire line communications system, a wireless communications system, or a combination of wire line and wireless may be utilized as the network in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared, cellular, microwave, satellite, packet radio, and spread spectrum radio.

An ACS record may be transmitted by methods and processes other than, or in combination with, a network. These methods and processes may include, but are not limited to, transferring data via, magnetic disk, optical disk, CD, solid state memory, or any other type of portable media or electronic communication means.

After the carrier creates an ACS electronic record for a mailpiece, a barcode may be generated at step 312. This barcode may identify a disposition of the mailpiece and a corrected address, if applicable. The carrier may further attach that barcode to a mailpiece for further processing at step 312. Once a disposition of a mailpiece is identified, a mailpiece may be placed in an appropriate mail flow, for example, for further forwarding to an intended addressee at step 314.

In an alternative embodiment, the carrier may scan a barcode containing a participant identification code and a keyline before sending a mailpiece for further processing. In this embodiment, the U.S. Postal Service™ may forward a mailpiece to the National Customer Support Center for further processing, including identifying corrected delivery address, only if forwarding endorsement requires a mailpiece forwarding or returning. A mailpiece may be also forwarded to the National Customer Support Center for processing if an Electronic Service Requested endorsement is requested.

One skilled in the art will recognize that many alternative embodiments are possible. For example, the carrier may use participant identification code to electronically create invoices for each ACS program participant. In yet another example, the carrier may create an individual invoice for each processed mailpiece and make that invoice a part of the ACS record. Other alternatives are possible without departing from the spirit and scope of the invention.

Figure 4:
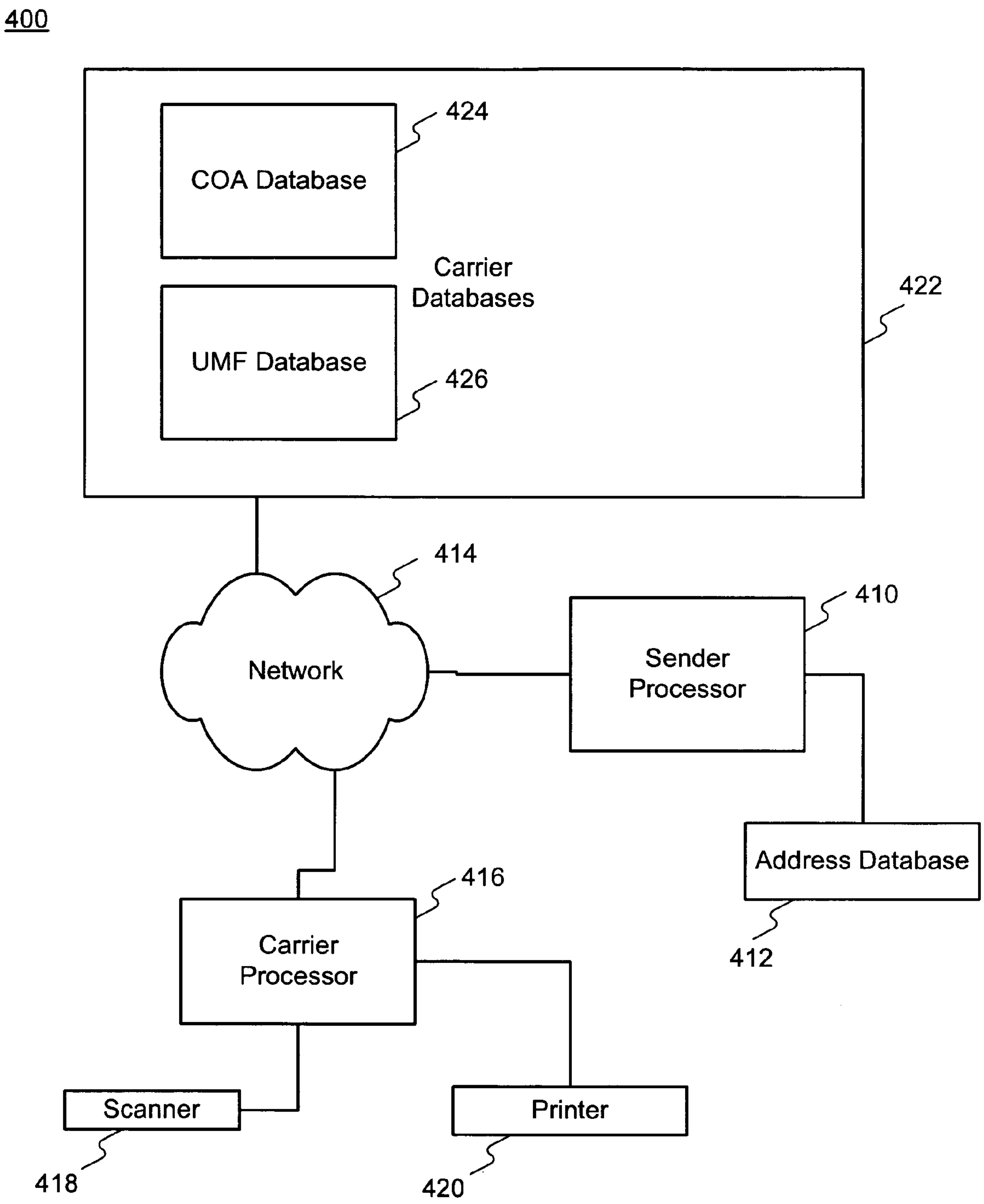
FIG. 4 is a block diagram of a system for providing one code address correction service.

FIG. 4 shows a block diagram of an exemplary system 400 for providing one code address correction service. A sender, using a processor 410 and an address database 412, initially generates an item to be delivered and affixes an address from the address database 412. That address may include a machine readable code, such as a bar code, as well as a human readable address. The bar code may identify the sender and may also identify all or part of the affixed address. A carrier receives the item from the sender and determines whether the item can be properly delivered to the affixed address. The carrier might scan the machine readable code using a scanner 418 connected to a carrier processor 416. The carrier processor 416 may include memory with an address database or may communicate with carrier databases 422 through a network 414 for a list of valid addresses.

If the item cannot be delivered to the affixed address, the carrier scans the machine readable code using the scanner 418, if not already done, and consults the carrier databases 422. Once the sender is identified from the machine readable code, a database, such as for example the Universal Mail File database 426, may list the action to take for that sender for undeliverable addressed items. If the sender has requested forwarding service, for example, the information from the same machine readable code can be checked against, for example, the Change of Address database 424.

If a forwarding address is determined, a printer 420 connected to the carrier processor 416 may printout a new address label including a new machine readable code. If the sender has requested address correction service, the carrier generates an address correction service record and sends the record to the sender. The address change record may be sent through the network 414 or may be delivered to the sender in a portable media.

The sender processor 410 may receive the address correction service record through the network 414 and automatically update the address database 412.

Any suitable combination of hardware, software and/or firmware may be used to implement the database memories, processing units, or other components. The aforementioned system and processors are exemplary and other systems and processors may comprise the aforementioned memory, processing unit, or other components, consistent with embodiments of the present invention.

The system may be implemented using personal or portable computers, network computers, mainframes, or other similar microcomputer-based workstations. The processors may comprise any type of computer operating environment, such as hand-held devices, multiprocessor systems, microprocessor-based or programmable sender electronic devices, minicomputers, mainframe computers, and the like. A processor may also be practiced in distributed computing environments where tasks are performed by remote processing devices. The aforementioned systems and devices are exemplary and the processors may comprise other systems or devices.

Figure 5:
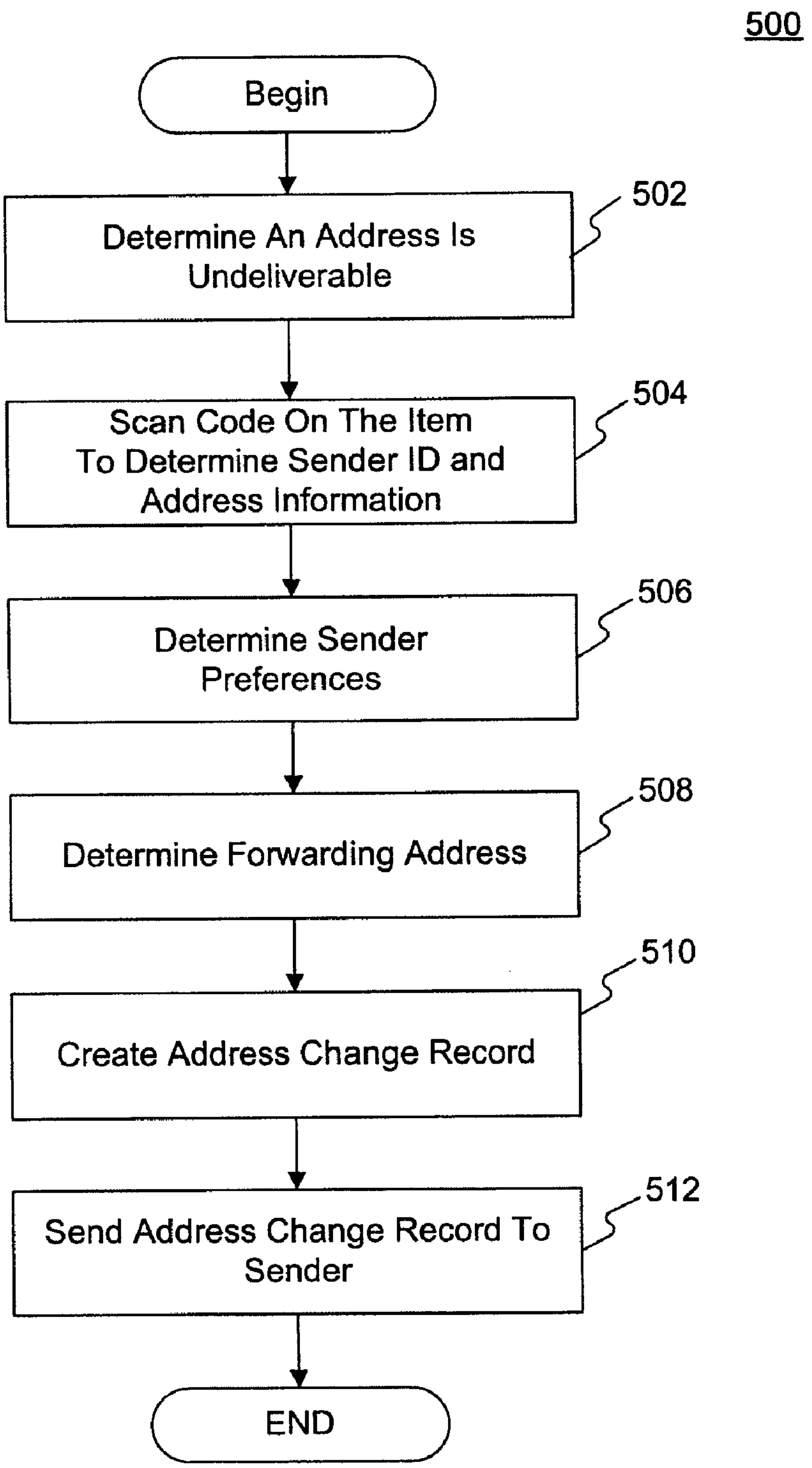
FIG. 5 is a flowchart of a process for creating and delivering an address change service record from one code.

FIG. 5 shows a flowchart of a process 500 for creating and delivering an address change service record from one code. Process 500 begins with determining an address is undeliverable at step 502. The carrier scans one machine readable code on the item, such as a barcode, to determine the identification of the sender and address information for the item at step 504. Once the sender has been identified through the machine readable code, the carrier determines the preferences for that sender at step 506. If the sender has requested forwarding services, the carrier determines a forwarding address at step 508. If the sender has not requested forwarding services, the carrier might skip step 508. If the sender has requested address change service, the carrier creates an address change record at step 510. The address change record might include the undeliverable address as well as a valid forwarding address. The carrier then sends the address change record to the sender at step 512.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for a carrier of items to provide a sender of an item an address change service, the item including a human-readable address that is an undeliverable address and a machine-readable barcode, the machine-readable barcode including first information identifying the sender and second information identifying the address, the method comprising:

storing, using a computer system, a plurality of sets of instructions for disposing of items having undeliverable addresses, wherein the plurality of sets of instructions are received from a plurality of senders;

determining, using the computer system, that the human-readable address on the item is undeliverable;

scanning the machine-readable barcode to identify the sender of the item;

identifying, using the computer system, a set of instructions associated with the sender from among the plurality of sets of instructions;

disposing the item according to the set of instructions associated with the sender;

creating, using the computer system, an address change record, the address change record including the undeliverable address; and sending the address change record to the sender.

2. The method of claim 1, wherein the item has only one barcode.

3. The method of claim 1, wherein the item has only one machine-readable barcode.

4. The method of claim 1, further comprising:

determining a forwarding address; and including the forwarding address in the address change record.

5. The method of claim 1, wherein sending the address change record comprises sending an electronic address change record through a network.

6. The method of claim 5, wherein the network comprises the Internet.

7. The method of claim 1, wherein sending the address change record comprises storing an electronic address change record on a portable media.

8. The method of claim 7, wherein the portable media comprises one of an optical disk, a magnetic disk, and a solid state memory.

9. An apparatus for providing an address change service to a sender of an item, the item including a human-readable address that is an undeliverable address and a machine-readable barcode, the machine-readable barcode, including first information identifying the sender and second information identifying the address, the apparatus comprising:

a scanner for scanning the machine-readable barcode;

a memory for storing a database of identifications and corresponding instructions for disposing of items having undeliverable addresses, wherein the corresponding instructions are received from a plurality of senders;

a processor for performing operations comprising:

receiving the machine-readable barcode scanned by the scanner, receiving from the database a set of instructions associated with the sender identified in the machine-readable barcode, directing processing of the item according to the set of instructions associated with the sender from among the plurality of sets of instructions, generating an address change record, the address change record including at least the undeliverable address; and means for sending the address change record to the sender.

10. The apparatus of claim 9, wherein the item has only one barcode.

11. The apparatus of claim 9, wherein the item has only one machine-readable barcode.

12. The apparatus of claim 9, further comprising a memory for storing a database of change of address records, and wherein the address change record includes a valid forwarding address.

13. The apparatus of claim 9, wherein the means for sending the address change record comprises an interface to a network.

14. The apparatus of claim 13, wherein the network comprises the Internet.

15. The apparatus of claim 9, wherein the means for sending the address change record comprises a portable media.

16. The apparatus of claim 15, wherein the portable media comprises one of an optical disk, a magnetic disk, and a solid state memory.

17. The method of claim 1, wherein the set of instructions includes instructions to discard the item having the undeliverable address.

18. The method of claim 1, wherein the set of instructions comprises one of a group of instructions consisting of:

forwarding the item to an intended recipient at a forwarding address, returning the item to the sender, and discarding the item.

19. A method for an item delivery service to provide a sender of an item with an address change service, the item including a human-readable address and a machine-readable barcode, the machine-readable barcode including first information identifying the sender and second information identifying the address, the method comprising:

accepting the item with the machine-readable barcode thereon;

receiving from a plurality of senders, using a computer system, a plurality of sets of instructions for disposing of items having undeliverable addresses;

determining, using the computer system, that the human-readable address on the item is an undeliverable address;

scanning the machine-readable barcode identifying the sender of the item;

determining from the machine-readable barcode, a set of instructions for disposing associated with the item from among the plurality of sets of instructions;

creating an address change record, the address change record including the undeliverable address; and sending the address change record to the sender.

20. The method of claim 19, wherein the set of instructions for disposing comprises one of a group of instructions consisting of:

sending an address change record including the undeliverable address to the sender, forwarding the item to an intended recipient at a forwarding address, returning the item to the sender, and discarding the item.

21. The method of claim 19, wherein the set of instructions for disposing comprises one of a group of instructions consisting of:

sending an address change record including a forwarding address for an intended recipient to the sender, confirming delivery of the item for the sender, and tracking a status of delivery of the item.

22. A method for identifying a disposition of an item, comprising:

receiving the item with a first code to a processing center;

scanning the first code to determine a requested endorsement, using a computer system, wherein the requested endorsement is received from a sender of the item specifying the disposition of the item;

determining change of address data for the item using the computer system;

creating an electronic record for the disposition of the item;

sending the electronic record for processing;

generating and attaching, using the computer system, a second code to the item that identifies the disposition of the item; and sorting the item according to the second code that identifies the disposition.

23. The method of claim 22, further including disposing the item according to the requested endorsement.

24. The method of claim 23, further including:

updating the electronic record with a status of the disposing to create an updated electronic record; and sending the updated electronic record to the sender.

25. A method for identifying a disposition of an item, comprising:

receiving the item having a delivery address from a sender;

receiving a set of instructions for a disposition of the item from the sender;

generating a first code corresponding to the delivery address using a computer system;

creating an electronic record containing the delivery address and the first code, using the computer system;

determining change of address data associated with the delivery address using the computer system;

updating the electronic record with the change of address data to create an updated electronic record, using the computer system;

generating, using the computer system, a second code for the item based on the change of address data associated with the delivery address and the set of instructions for the disposition of the item;

applying the second code to the item; and sending the updated electronic record to the sender.

26. A computer-implemented method of providing instructions for disposing of an item, the item including a human-readable address corresponding to an undeliverable address, the method comprising:

applying a machine-readable barcode to the item, the machine-readable barcode including first information identifying a sender of the item and second information comprising a set of instructions for disposing of the item;

sending the item to a carrier of items, wherein the carrier of items performs operations comprising:

storing, using a computer system, a plurality of sets of instructions for disposing of items having undeliverable addresses, wherein the plurality of sets of instructions are received from a plurality of senders;

determining, using the computer system, that the human-readable address on the item is undeliverable;

scanning the machine-readable barcode to identify the sender of the item;

identifying, using the computer system, the set of instructions from among the plurality of sets of instructions;

creating, using the computer system, an address change record that includes the undeliverable address; and sending the address change record to the sender.

* * * * *